US012689791B2

(12) United States Patent
Northway et al.

(10) Patent No.: US 12,689,791 B2
(45) Date of Patent: Jul. 21, 2026

(54) COMPUTING DEVICE AND METHOD FOR EXPANDING VIDEO VIEWING AREA

(71) Applicant: Lemon Inc., Grand Cayman (KY)

(72) Inventors: Ryan Northway, Culver City, CA (US); Michael Martinho, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 54 days.

(21) Appl. No.: 18/793,551

(22) Filed: Aug. 2, 2024

(65) Prior Publication Data

US 2026/0039899 A1 Feb. 5, 2026

(51) Int. Cl.
*H04N 21/431* (2011.01)
*G06F 3/0485* (2022.01)

(52) U.S. Cl.
CPC ....... *H04N 21/4312* (2013.01); *G06F 3/0485* (2013.01)

(58) Field of Classification Search
None
See application file for complete search history.

(56) References Cited

U.S. PATENT DOCUMENTS

| | | | | |
|---|---|---|---|---|
| 8,527,899 B2 * | 9/2013 | Miyazawa | ......... | H04N 21/4668 715/784 |
| 8,543,919 B1 | 9/2013 | Amzallag et al. | | |
| 8,572,490 B2 * | 10/2013 | Hartwig | .................. | G06F 16/70 715/719 |
| 10,751,612 B1 * | 8/2020 | Urbanus | ............ | H04N 21/4781 |

| | | | | |
|---|---|---|---|---|
| 11,259,088 B2 * | 2/2022 | Zimmerman | .... | H04N 21/47217 |
| 11,838,601 B2 * | 12/2023 | Tomita | ............. | H04N 21/25866 |
| 12,034,995 B2 * | 7/2024 | Dong | .................... | G06F 3/0482 |
| 12,099,711 B2 * | 9/2024 | Luo | ...................... | G06F 3/04845 |
| 12,200,309 B1 * | 1/2025 | Holland | .................. | H04L 65/61 |
| 12,348,824 B2 * | 7/2025 | Dziuk | ................ | H04N 21/8113 |
| 2003/0046695 A1 * | 3/2003 | Billmaier | .......... | H04N 21/4438 348/E5.103 |

(Continued)

FOREIGN PATENT DOCUMENTS

| | | |
|---|---|---|
| CN | 109408752 A | 3/2019 |
| WO | 2015062402 A1 | 5/2015 |

OTHER PUBLICATIONS

ISA Intellectual Property Office of Singapore, International Search Report Issued in Application No. PCT/SG2025/050516, Sep. 2, 2025, WIPO, 3 pages.

*Primary Examiner* — Mushfikh I Alam
(74) *Attorney, Agent, or Firm* — Alleman Hall LLP

(57) ABSTRACT

A computing device for expanding video viewing area is provided, including processing circuitry configured to execute a video player client using a browser program. The video player client is configured to display a first video of a video feed in a first display region of the GUI in a first display mode in which a browser address bar, a browser navigation bar, the first video, and a video player tool bar of the video player client are displayed. The video player client is configured to display a second video in a second display region in a second display mode in which the second video, the video player tool bar, and a third video are displayed. The second display region is vertically larger than the first display region, and the third video is displayed below the second video and under the video player tool bar and over the navigation bar.

20 Claims, 7 Drawing Sheets

(56)     References Cited

U.S. PATENT DOCUMENTS

| | | | |
|---|---|---|---|
| 2004/0201608 A1* | 10/2004 | Ma | H04N 21/4263 |
| | | | 715/719 |
| 2004/0201610 A1* | 10/2004 | Rosen | G06F 40/117 |
| | | | 715/202 |
| 2009/0217317 A1* | 8/2009 | White | H04N 21/812 |
| | | | 725/32 |
| 2012/0287133 A1* | 11/2012 | Lee | G09G 5/14 |
| | | | 345/428 |
| 2013/0290818 A1* | 10/2013 | Arrasvuori | H04N 21/4383 |
| | | | 715/201 |
| 2014/0223307 A1* | 8/2014 | McIntosh | H04N 21/47217 |
| | | | 715/719 |
| 2014/0373057 A1* | 12/2014 | Hoffert | H04N 21/4312 |
| | | | 725/100 |
| 2015/0253974 A1* | 9/2015 | Young | A63F 13/26 |
| | | | 715/717 |
| 2016/0127772 A1* | 5/2016 | Tsiridis | H04N 21/433 |
| | | | 725/41 |
| 2017/0094360 A1* | 3/2017 | Keighran | G06F 3/04842 |
| 2017/0180772 A1* | 6/2017 | Wilms | H04N 21/44218 |
| 2018/0160165 A1* | 6/2018 | Cormican | H04N 21/42224 |
| 2020/0159402 A1* | 5/2020 | Baghadady | H04N 21/8456 |
| 2021/0227291 A1* | 7/2021 | Wolowiec | G06F 18/213 |
| 2023/0186015 A1* | 6/2023 | Doherty | H04N 21/431 |
| | | | 715/720 |

* cited by examiner

100 ⟶

COMPUTING DEVICE AND METHOD FOR EXPANDING VIDEO VIEWING AREA

BACKGROUND

In today's digital age, smartphones and online social media platforms facilitate the rapid sharing of original content worldwide. Users actively upload, consume, and engage with a plethora of media on their smartphones daily, including photos, long-form videos, and short-form videos. However, the display sizes of smartphones can vary significantly, typically ranging from around 4 inches to 7 inches. This limited screen real estate poses challenges for both content creators and users. Further, technical constraints of the software environment can limit how a content creator's content can be displayed within this small screen size. Specifically, when content is displayed within an application running in a browser program on a smartphone or tablet, for example, native behavior of the browser can further limit the available space to display the application content. As a result, a user might view only part of a video, limiting the user's experience and enjoyment of the content.

SUMMARY

A computing device for expanding video viewing area is provided herein. In one example, the computing device includes processing circuitry and memory storing instructions that, when executed by the processing circuitry, cause the processing circuitry to execute a video player client using a browser program. The processing circuitry is further configured to render a graphical user interface (GUI) of the video player client in a browser window of the browser program. The video player client is configured to display a first video of a video feed in a first display region of the GUI in a first display mode in which a browser address bar and a browser navigation bar of the browser program, the first video, and a video player tool bar of the video player client are displayed in the browser window. In response to receiving a user input to scroll to a second video of the video feed, the video player client is further configured to display the second video in a second display region of the GUI in a second display mode in which at least the second video, the video player tool bar of the video player client, and a third video are displayed in the browser window. In the second display mode, the second display region is vertically larger than the first display region of the first display mode, and the third video is displayed below the second video and under the video player tool bar of the video player client and over the browser navigation bar, to thereby inhibit display of the browser navigation bar and enable display of the video player tool bar and the third video.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
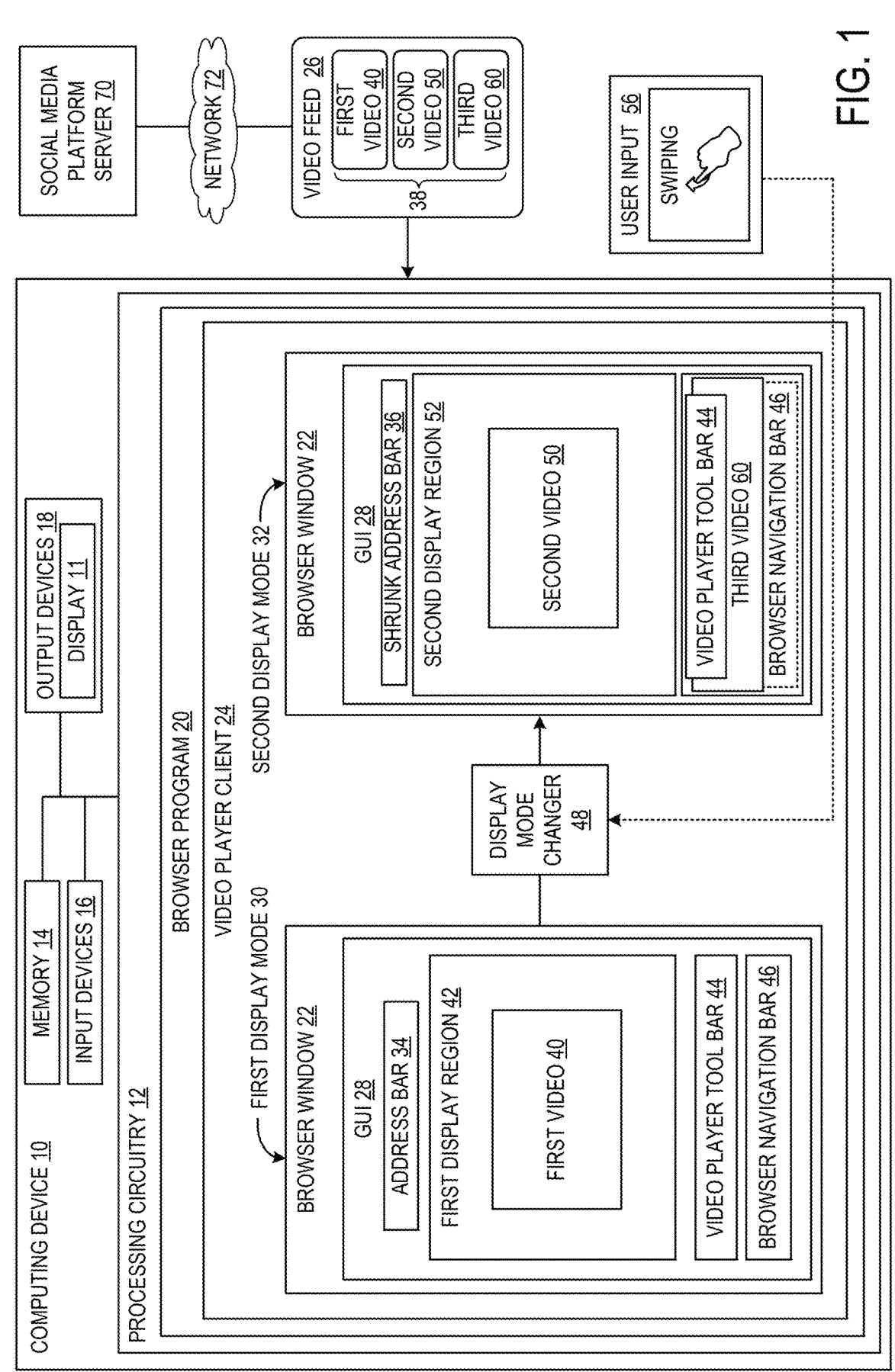
FIG. 1 shows a schematic view of a computing device for expanding video viewing area.

As shown in FIG. 1, to address the issues described above a computing device 10 is provided for expanding video viewing area of a computing device display. The computing device 10 serves as a client device, including devices such as smartphones, tablets, smartwatches, and personal computers, all of which typically feature relatively small display screens. The computing device 10 comprises processing circuitry 12, memory 14, one or more input devices 16 for receiving user input 56, and output devices 18, such as display 11. The memory 14 stores instructions that, when executed by the processing circuitry 12, cause the processing circuitry 12 to execute a video player client 24 using a browser program 20, and render a graphical user interface (GUI) 28 of the video player client 24 in a browser window 22 of the browser program 20. The video player client 24 is configured to download a plurality of videos 38, including a first video 40, a second video 50, and a third video 60, in a video feed 26 from a social media platform server 70 via a computer network 72 and play the plurality of videos 38 using the browser program 20. The browser program 20 may be a mobile web browser that is designed for a smartphone or tablet, or other suitable type of browser program. The social media platform server 70 may be a user video-sharing platform, and the video player client 24 may be a user video-sharing application configured to create and play the videos 38 in the video feed 26. The videos 38 in the video feed 26, including the first video 40, the second video 50, and the third video 60, may be short-form videos that have durations ranging from 15 seconds to 3 minutes. Other length videos are also possible. The browser program 20 may be provided by the manufacturer of the computing device 10, and the browser program 20 may be a native application installed on the computing device 10. In contrast, the video player client 24 may be provided by a provider of the social media platform server 70. The provider of the browser program 20 differs from that of the video player client 24, and limitations of the native behavior of the browser program 20 presents a technical challenge to expanding the video viewing area within the video player client 24 while it runs within the browser program 20, as discussed above.

Figures 2A, 2B:
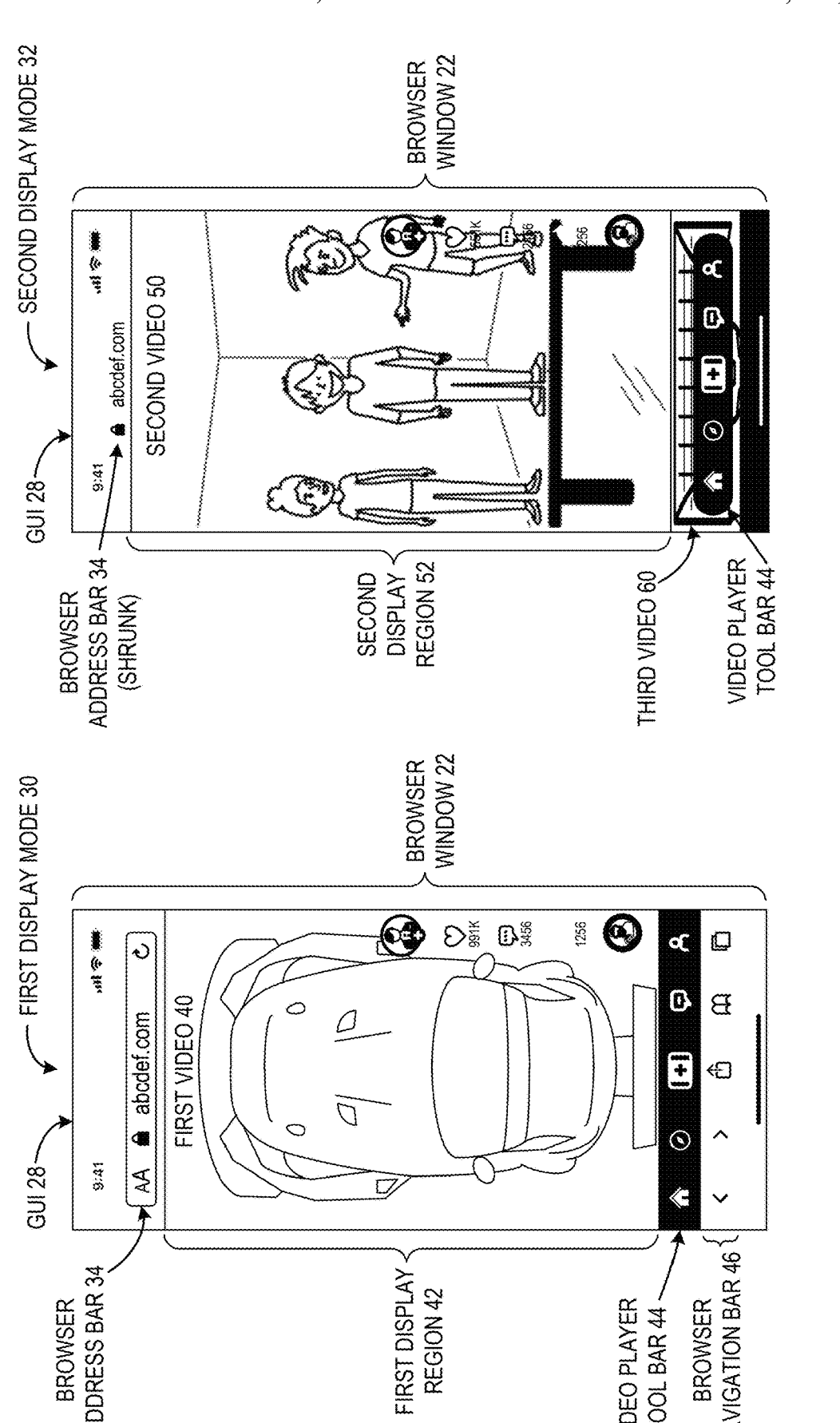
FIG. 2A shows an example graphical user interface (GUI) of the computing device of FIG. 1, displaying a first video in a first display mode.
FIG. 2B shows an example GUI of the computing device of FIG. 1, displaying a second video and a third video in a second display mode.

The video player client 24 is configured to display the first video 40 of the video feed 26 in a first display region 42 of the GUI 28 in a first display mode 30, as depicted at FIG. 1. In the first display mode 30, a browser address bar 34 and a browser navigation bar 46 of the browser program 20, the first video 40, and a video player tool bar 44 of the video player client 24 are displayed in the browser window 22. Briefly turning to FIG. 2A, this figure shows an example GUI 28 of the computing device 10 of FIG. 1, displaying the first video 40 in the first display mode 30. In the depicted example, the browser address bar 34 of the browser program 20 is displayed right above the first video 40 at the top of the browser window 22, while the browser navigation bar 46 of the browser program 20 is displayed right below the video player tool bar 44 at the bottom of the browser window 22. It will be appreciated that the browser address bar 34 of the browser program 20 may be positioned at the bottom of the browser window 22 of browser program 20, while the browser navigation bar 46 of the browser program 20 may be positioned at the top of the browser window 22 or above the video player tool bar 44. As shown in the depicted example, the first video 40 is displayed in the first display region 42, and the video player tool bar 44 of the video player client 24 is displayed right below the first video 40 and above the browser navigation bar 46. It will be appreciated that the video player tool bar 44 of the video player client 24 may be displayed right above the first video 40 at the top of the browser window 22.

Figure 3:
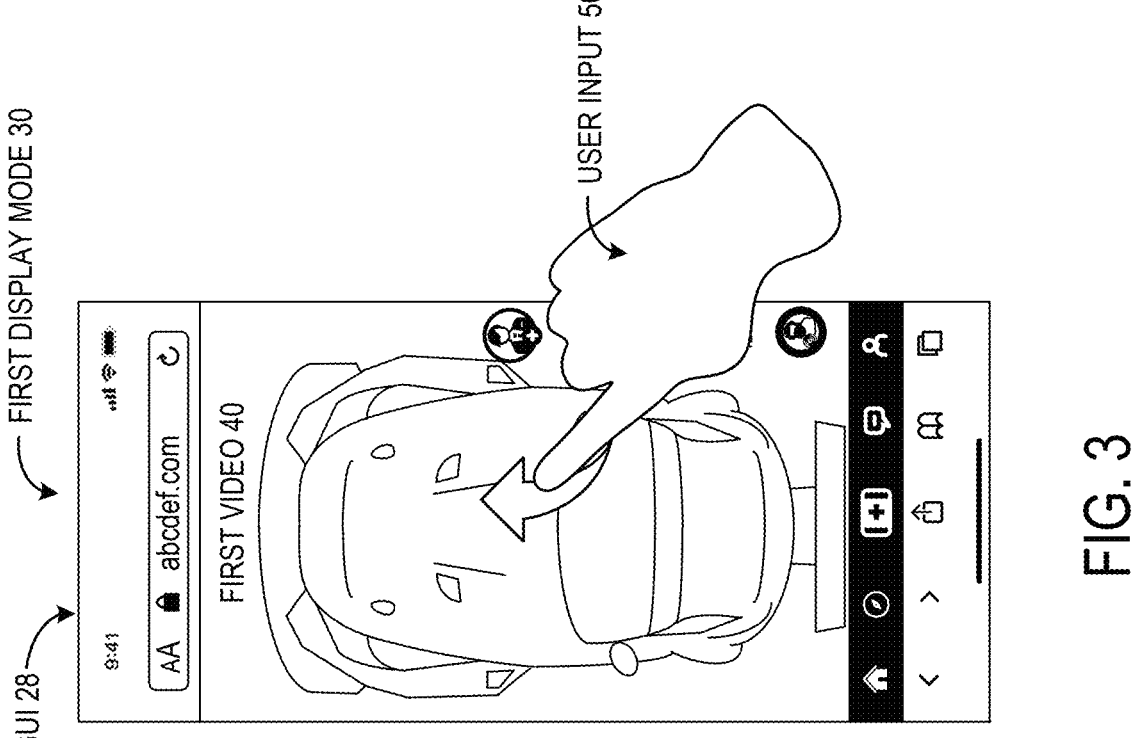
FIG. 3 shows an example user input to scroll to the second video from the first video.

Turning back to FIG. 1, in response to receiving the user input 56 to scroll to the second video 50 of the video feed 26, the video player client 24 is configured to display the second video 50 in a second display region 52 of the GUI 28 in a second display mode 32. The display mode is switched to the second display mode 32 from the first display mode 30 via a display mode changer 48 in response to the user input 56. Briefly turning to FIG. 3, this figure shows an example user input 56 to scroll to the second video 50 from the first video 40. As shown in the depicted example, the user input 56 may include swiping a digit of the user vertically upward on a touch screen of the computing device 10. It will be appreciated that different types of the user input 56, such as voice input 56, can also trigger the transition to the second display mode 32 from the first display mode 30.

Figure 4:
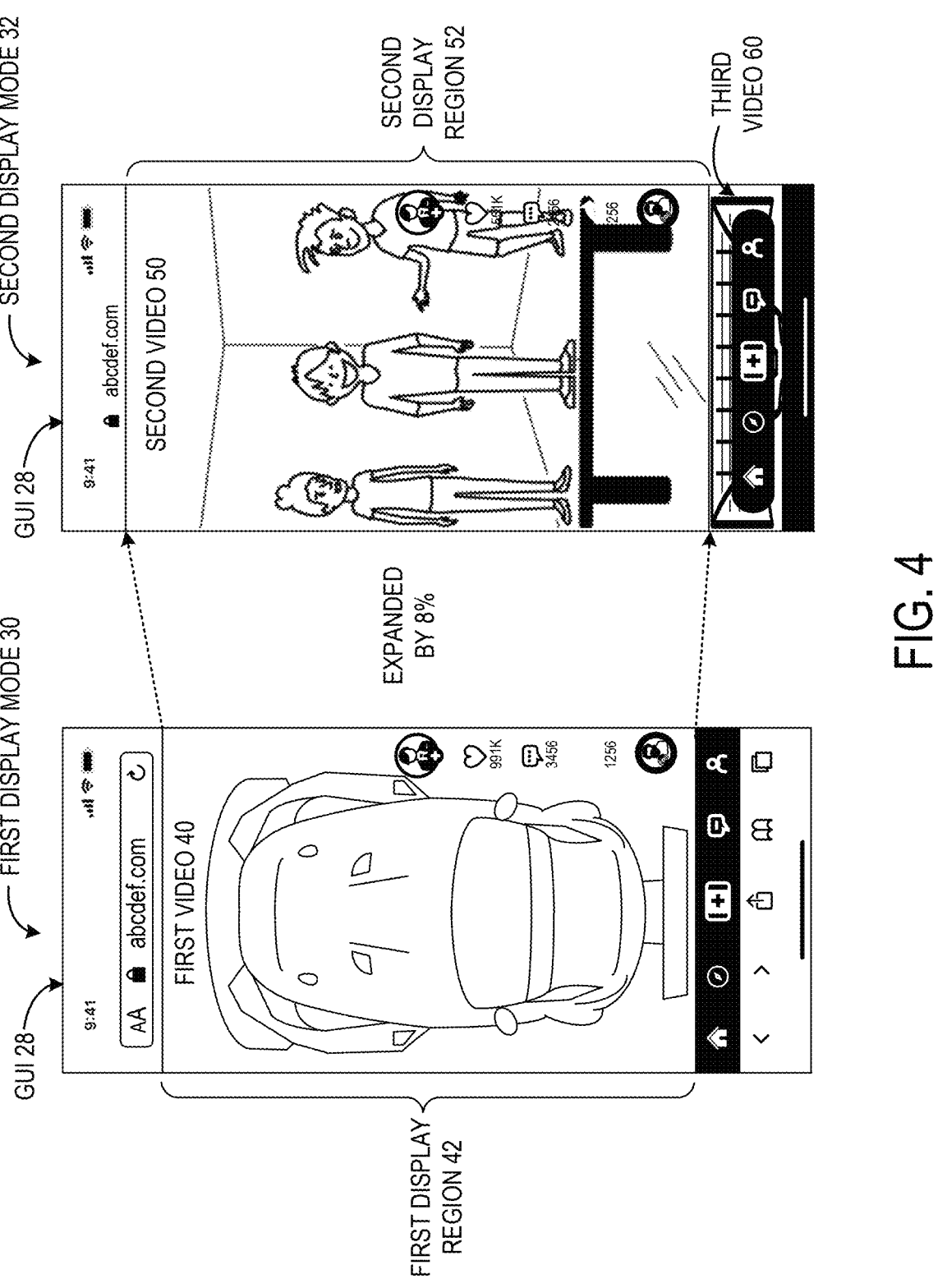
FIG. 4 shows a comparison of the display size between a first display region for the first video and a second display region for the second video.

Turning back to FIG. 1, in the second display mode 32, at least the second video 50, the video player tool bar 44 of the video player client 24, and the third video 60 are displayed in the browser window 22. Briefly turning to FIG. 2B, this figure illustrates an example GUI 28 of the computing device 10 of FIG. 1, displaying the second video 50 and the third video 60 in the second display mode 32. As shown in the depicted example, the second video 50 is displayed in the second display region 52, and the third video 60 is displayed below the second display region 52 where only a top portion of the third video 60 is visible in the GUI 28. The third video 60 is shaded such that the second video 50 is brighter than the third video 60 in the second display mode, while both the second video 50 and the third video 60 are playing contemporaneously in the GUI 28. It will be appreciated that other image techniques than shading can be used such that users are able to perceive the ambiance of the third video 60 distinctly from the second video 50, such as different framing (e.g., highlighted frame around the video), filters (applying colors or lighting to the video), or effects (sparkle, contrast, etc. applied to the video), etc. The video player tool bar 44 is displayed over the third video 60 where the video player tool bar 44 is surrounded by the third video 60 in the GUI 28 in the second display mode 32. The browser address bar 34 is displayed at the top of the GUI 28 and is shrunk in the second displayed mode 32. It will be appreciated that the browser address bar 34 can be hidden, instead of being shrunk. In the second display mode 32, the second display region 52 is vertically larger than the first display region 42 of the first display mode 30. Briefly turning to FIG. 4, this figure shows a comparison of the display size between the first display region 42 for the first video 40 and the second display region 52 for the second video 50. In the depicted example, the second display region 52 for the second video 50 is vertically larger than the first display region 42 for the first video 40 by approximately 8%. It will be appreciated that the second display region 52 can be vertically larger than the first display region 42 by between 5% to 25% by, for example, reducing the vertical size of the third video 60 or hiding the browser address bar 34.

Figure 5:
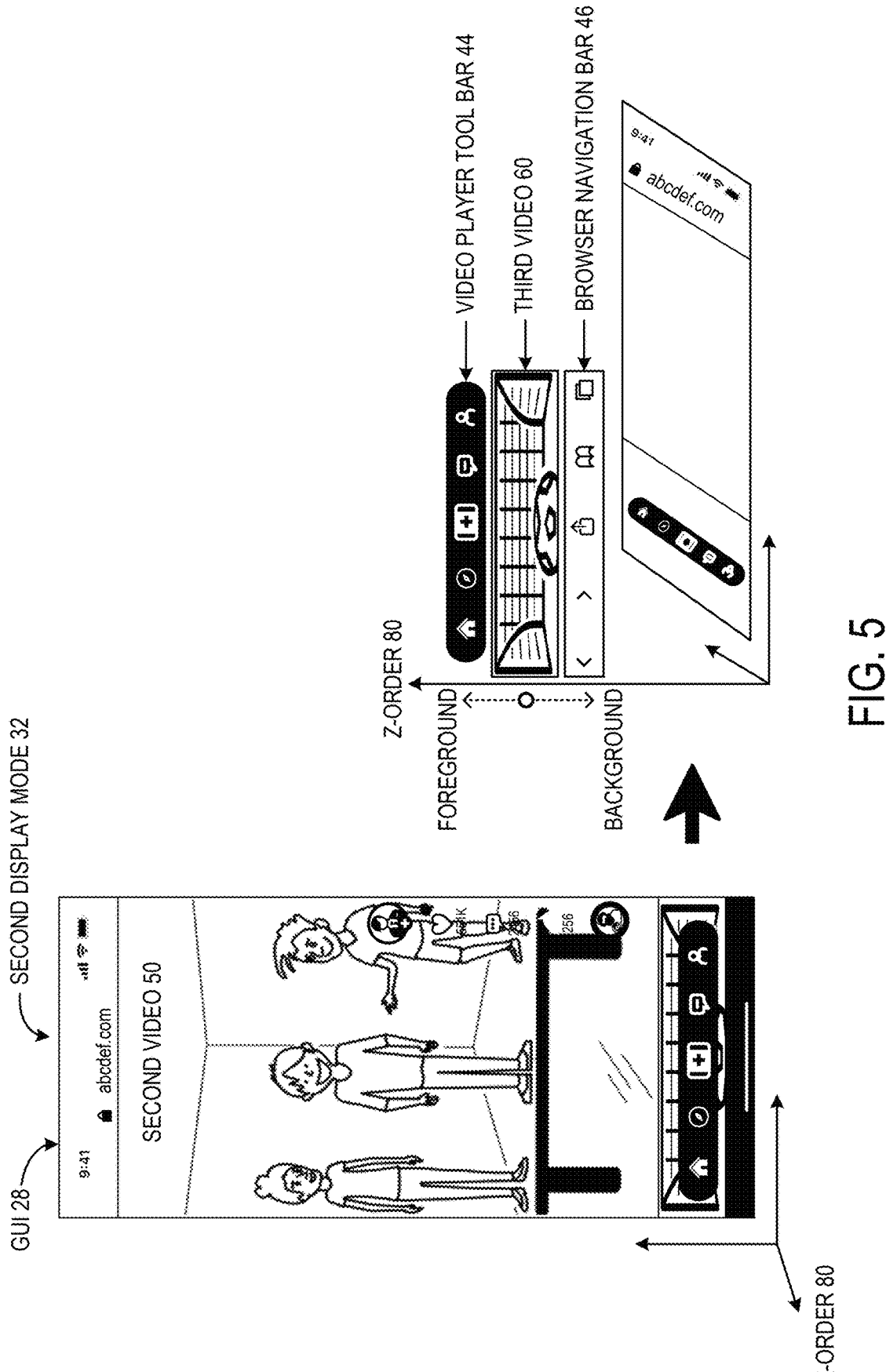
FIG. 5 illustrates a z-order of the third video that positions the third video in the GUI relative to a browser navigation bar and a video player tool bar in the second display mode.

Moreover, in the second display mode 32, the third video 60 is displayed below the second video 50 and under the video player tool bar 44 of the video player client 24 and over the browser navigation bar 46, to thereby inhibit display of the browser navigation bar 46 and enable display of the video player tool bar 44 and the third video 60. Turning to FIG. 5, this figure illustrates a z-order 80 of the third video 60 that positions the third video 60 in the GUI 28 relative to the video player tool bar 44 and the browser navigation bar 46 in the second display mode 32. As shown in the figure, the z-order 80 refers to the visual stacking order of elements on the screen of the computing device, with a z-axis of the z-order being orthogonal to the display 11. In the second display mode 32, the third video 60 is assigned a z-order 80 that positions the third video 60 in the foreground of the GUI 28 relative to the browser navigation bar 46, and positions the third video 60 in the background of the GUI 28 relative to the video player tool bar 44. A web browser engine such as WebKit, an open-source web browser engine primarily used by several popular web browsers, can be utilized to change the z-order 80 of the third video 60, the video player tool bar 44, and the browser navigation bar 46. In WebKit, z-order is the visual result of stacking elements based on their z-index values, and thus z-order can be changed by adjusting the z-index values. The z-index property in Cascading Style Sheets (CSS) determines the stacking order of positioned elements within a stacking context. Higher z-index values bring an element closer to the front (closer to the user), while lower values push it further back in the stacking order. Thus, fine-tuning the z-index values and z-order for the third video 60, the video player tool bar 44, and the browser navigation bar 46 allows stacking the third video 60 and video player tool bar 44 above the browser navigation bar 46, effectively hiding it from view.

Figure 6:
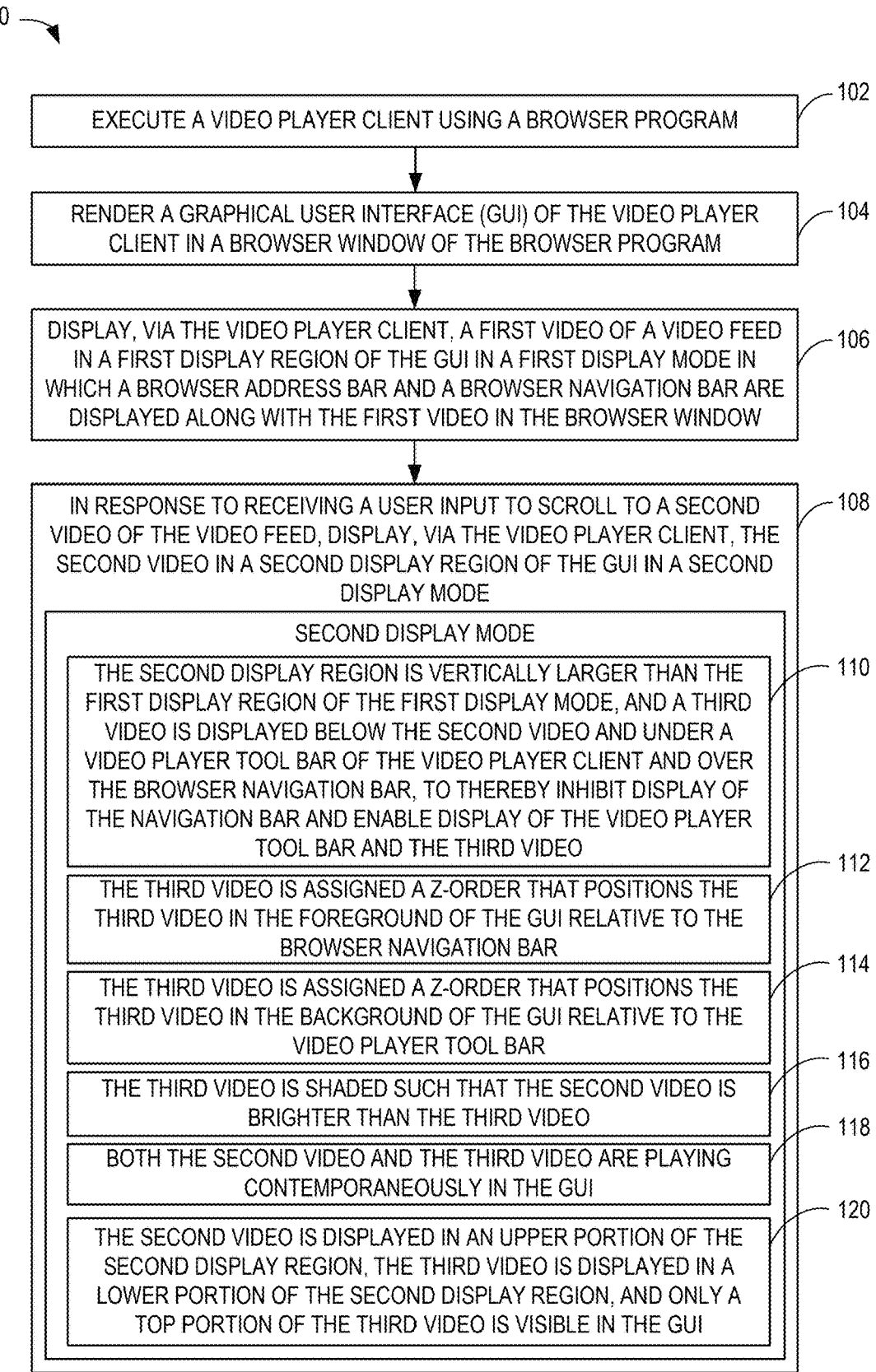
FIG. 6 shows a flowchart of a computerized method for expanding video viewing area.

FIG. 6 shows a flowchart for a computerized method 100 for expanding video viewing area according to the present disclosure. The method 100 may be implemented by the computing system 10 illustrated in FIG. 1. At 102, the method 100 may include executing a video player client using a browser program. At 104, the method 100 may include rendering a graphical user interface (GUI) of the video player client in a browser window of the browser program. At 106, the method 100 may include displaying, via the video player client, a first video of a video feed in a first display region of the GUI in a first display mode in which a browser address bar and a browser navigation bar of the browser program, the first video, and a video player tool bar of the video player client are displayed in the browser window. At 108, the method 100 may include, in response to receiving a user input to scroll to a second video of the video feed, displaying, via the video player client, the second video in a second display region of the GUI in a second display mode in which at least the second video, the video player tool bar of the video player client, and a third video are displayed in the browser window.

At 110, in the second display mode, the second display region may be vertically larger than the first display region of the first display mode, and the third video is displayed below the second video and under the video player tool bar of the video player client and over the browser navigation bar, to thereby inhibit display of the browser navigation bar and enable display of the video player tool bar and the third video. At 112, in the second display mode, the third video is assigned a z-order that positions the third video in the foreground of the GUI relative to the browser navigation bar. At 114, in the second display mode, the third video is assigned a z-order that positions the third video in the background of the GUI relative to the video player tool bar. At 116, the third video is shaded such that the second video is brighter than the third video in the second display mode. At 118, both the second video and the third video are playing contemporaneously in the GUI in the second display mode. At 120, in the second display mode, the second video is displayed in an upper portion of the second display region, the third video is displayed in a lower portion of the second display region, and only a top portion of the third video is visible in the GUI.

The above computing device and method can efficiently expand the video viewing area for a video player client running in a web browser on a computing device. Furthermore, this same technology allows effective previewing of a third video while concurrently playing a second video from a video feed. These enhancements not only improve readability but also enhance user engagement and overall satisfaction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
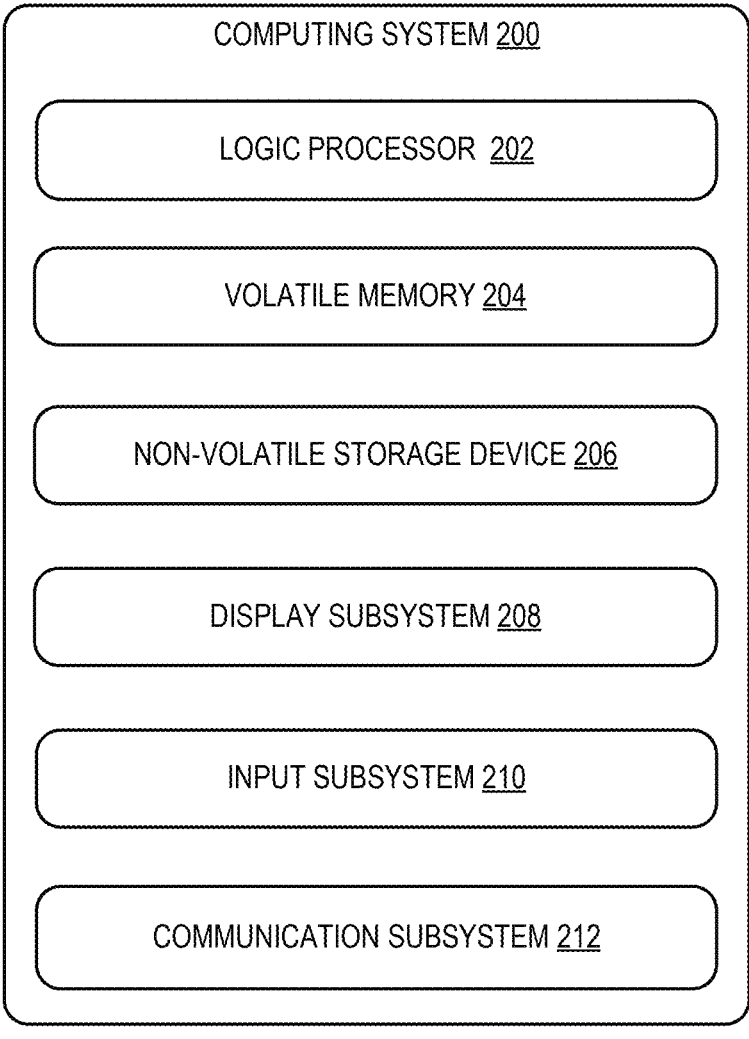
FIG. 7 shows a schematic view of an example computing environment in which the computing system of FIG. 1 may be enacted.

FIG. 7 schematically shows a non-limiting embodiment of a computing system 200 that can enact one or more of the methods and processes described above. Computing system 200 is shown in simplified form. Computing system 200 may embody the computer device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs provide additional description of the subject matter of the present disclosure. One aspect provides a computing device for expanding video viewing area comprising processing circuitry and memory storing instructions that, when executed by the processing circuitry, cause the processing circuitry to execute a video player client using a browser program. The processing circuitry is further configured to render a graphical user interface (GUI) of the video player client in a browser window of the browser program. The video player client is configured to display a first video of a video feed in a first display region of the GUI in a first display mode in which a browser address bar and a browser navigation bar of the browser program, the first video, and a video player tool bar of the video player client are displayed in the browser window. In response to receiving a user input to scroll to a second video of the video feed, the video player client is configured to display the second video in a second display region of the GUI in a second display mode in which at least the second video, the video player tool bar of the video player client, and a third video are displayed in the browser window. In the second display mode, the second display region is vertically larger than the first display region of the first display mode, and the third video is displayed below the second video and under the video player tool bar of the video player client and over the browser navigation bar, to thereby inhibit display of the browser navigation bar and enable display of the video player tool bar and the third video.

In this aspect, in the second display mode, the third video is assigned a z-order that positions the third video in the foreground of the GUI relative to the browser navigation bar.

In this aspect, in the second display mode, the third video is assigned a z-order that positions the third video in the background of the GUI relative to the video player tool bar.

In this aspect, the third video is shaded such that the second video is brighter than the third video in the second display mode.

In this aspect, the video player tool bar is surrounded by the third video in the GUI in the second display mode.

In this aspect, both the second video and the third video are playing contemporaneously in the GUI in the second display mode.

In this aspect, in the second display mode, the third video is displayed below the second display region, and only a top portion of the third video is visible in the GUI.

In this aspect, the second display region is vertically larger than first display region by between 5% to 25%.

In this aspect, the first video, the second video, and the third video in the video feed have durations ranging from 15 seconds to 3 minutes.

In this aspect, the browser address bar is shrunk in the second display mode.

In this aspect, the user input includes swiping a digit of the user vertically upward on a touch screen of the computing device.

In this aspect, the browser program is a mobile web browser that is designed for a smartphone or tablet.

In this aspect, the video player client is configured to download the first video, the second video, and the third video in the video feed from a social media platform server via a computer network.

Another aspect provides a computerized method for expanding video viewing area comprising executing a video player client using a browser program, rendering a graphical user interface (GUI) of the video player client in a browser window of the browser program, displaying, via the video player client, a first video of a video feed in a first display region of the GUI in a first display mode in which a browser address bar and a browser navigation bar of the browser program, the first video, and a video player tool bar of the video player client are displayed in the browser window, and in response to receiving a user input to scroll to a second video of the video feed, displaying, via the video player client, the second video in a second display region of the GUI in a second display mode in which at least the second video, the video player tool bar of the video player client, and a third video are displayed in the browser window. In the second display mode, the second display region is vertically larger than the first display region of the first display mode, and the third video is displayed below the second video and under the video player tool bar of the video player client and over the browser navigation bar, to thereby inhibit display of the browser navigation bar and enable display of the video player tool bar and the third video.

In this aspect, in the second display mode, the third video is assigned a z-order that positions the third video in the foreground of the GUI relative to the browser navigation bar.

In this aspect, in the second display mode, the third video is assigned a z-order that positions the third video in the background of the GUI relative to the video player tool bar.

In this aspect, the third video is shaded such that the second video is brighter than the third video in the second display mode.

In this aspect, both the second video and the third video are playing contemporaneously in the GUI in the second display mode.

In this aspect, in the second display mode, the third video is displayed below the second display region, and only a top portion of the third video is visible in the GUI.

Another aspect provides a computing device for expanding video viewing area comprising processing circuitry and memory storing instructions that, during execution, cause the processing circuitry to execute a video player client using a browser program. The processing circuitry is further configured to render a graphical user interface (GUI) of the video player client in a browser window of the browser program. The video player client is configured to display a first video of a video feed in a first display region of the GUI in a first display mode in which a browser address bar and a browser navigation bar of the browser program, the first video, and a video player tool bar of the video player client are displayed in the browser window. In response to receiving a user input to scroll to a second video of the video feed, the video player client is configured to display the second video in a second display region of the GUI in a second display mode in which at least the second video, the video player tool bar of the video player client, and a third video are displayed in the browser window. In the second display mode, the second display region is vertically larger than the first display region of the first display mode, and the third video is displayed below the second video and under the video player tool bar of the video player client and over the browser navigation bar, to thereby inhibit display of the browser navigation bar and enable display of the video player tool bar and the third video. The third video is assigned a z-order that positions the third video in the foreground of the GUI relative to the browser navigation bar and positions the third video in the background of the GUI relative to the video player tool bar, and in the second display mode, the second video is displayed in an upper portion of the second display region, the third video is displayed in a lower portion of the second display region, and only a top portion of the third video is visible in the GUI.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for expanding video viewing area, comprising:
processing circuitry and memory storing instructions that, when executed by the processing circuitry, cause the processing circuitry to:
execute a video player client using a browser program; and
render a graphical user interface (GUI) of the video player client in a browser window of the browser program, wherein
the video player client is configured to display a first video of a video feed in a first display region of the GUI in a first display mode in which a browser address bar and a browser navigation bar of the browser program, the first video, and a video player tool bar of the video player client are displayed in the browser window,
in response to receiving a user input to scroll to a second video of the video feed, the video player client is configured to display the second video in a second display region of the GUI in a second display mode in which at least the second video, the video player tool bar of the video player client, and a third video are displayed in the browser window, and
in the second display mode, the second display region is vertically larger than the first display region of the first display mode, and the third video is displayed below the second video and under the video player tool bar of the video player client in a visual stacking order along a z-axis, such that the video player tool bar overlays the third video and the third video overlays the browser navigation bar, to thereby inhibit display of the browser navigation bar and enable display of the video player tool bar and a portion of the third video that remains visible beyond the video player tool bar.

2. The computing device of claim 1, wherein in the second display mode, the third video is assigned a z-order corresponding to the visual stacking order along the z-axis that positions the third video in the foreground of the GUI relative to the browser navigation bar.

3. The computing device of claim 2, wherein in the second display mode, the third video is assigned the z-order that positions the third video in the background of the GUI relative to the video player tool bar.

4. The computing device of claim 1, wherein the third video is shaded such that the second video is brighter than the third video in the second display mode.

5. The computing device of claim 1, wherein the video player tool bar is surrounded by the third video in the GUI in the second display mode.

6. The computing device of claim 1, wherein both the second video and the third video are playing contemporaneously in the GUI in the second display mode.

7. The computing device of claim 1, wherein, in the second display mode, the third video is displayed below the second display region, and only a top portion of the third video is visible in the GUI.

8. The computing device of claim 1, wherein the second display region is vertically larger than first display region by between 5% to 25%.

9. The computing device of claim 1, wherein the first video, the second video, and the third video in the video feed have durations ranging from 15 seconds to 3 minutes.

10. The computing device of claim 1, wherein the browser address bar is shrunk in the second display mode.

11. The computing device of claim 1, wherein
the user input includes swiping a digit of the user verti-
cally upward on a touch screen of the computing
device.

12. The computing device of claim 1, wherein,
the browser program is a mobile web browser that is
designed for a smartphone or tablet.

13. The computing device of claim 1, wherein
the video player client is configured to download the first
video, the second video, and the third video in the video
feed from a social media platform server via a com-
puter network.

14. A computerized method for expanding video viewing
area, comprising:
executing a video player client using a browser program;
rendering a graphical user interface (GUI) of the video
player client in a browser window of the browser
program;
displaying, via the video player client, a first video of a
video feed in a first display region of the GUI in a first
display mode in which a browser address bar and a
browser navigation bar of the browser program, the
first video, and a video player tool bar of the video
player client are displayed in the browser window; and
in response to receiving a user input to scroll to a second
video of the video feed, displaying, via the video player
client, the second video in a second display region of
the GUI in a second display mode in which at least the
second video, the video player tool bar of the video
player client, and a third video are displayed in the
browser window, wherein
in the second display mode, the second display region is
vertically larger than the first display region of the first
display mode, and the third video is displayed below
the second video and under the video player tool bar of
the video player client in a visual stacking order along
a z-axis, such that the video player tool bar overlays the
third video and the third video overlays the browser
navigation bar, to thereby inhibit display of the browser
navigation bar and enable display of the video player
tool bar and a portion of the third video that remains
visible beyond the video player tool bar.

15. The computerized method of claim 14, wherein
in the second display mode, the third video is assigned a
z-order corresponding to the visual stacking order
along the z-axis that positions the third video in the
foreground of the GUI relative to the browser naviga-
tion bar.

16. The computerized method of claim 15, wherein
in the second display mode, the third video is assigned the
z-order that positions the third video in the background
of the GUI relative to the video player tool bar.

17. The computerized method of claim 14, wherein
the third video is shaded such that the second video is
brighter than the third video in the second display
mode.

18. The computerized method of claim 14, wherein
both the second video and the third video are playing
contemporaneously in the GUI in the second display
mode.

19. The computerized method of claim 14, wherein,
in the second display mode, the third video is displayed
below the second display region, and only a top portion
of the third video is visible in the GUI.

20. A computing device for expanding video viewing
area, comprising:
processing circuitry and memory storing instructions that,
when executed by the processing circuitry, cause the
processing circuitry to:
execute a video player client using a browser program;
and
render a graphical user interface (GUI) of the video
player client in a browser window of the browser
program, wherein
the video player client is configured to display a first video
of a video feed in a first display region of the GUI in
a first display mode in which a browser address bar and
a browser navigation bar of the browser program, the
first video, and a video player tool bar of the video
player client are displayed in the browser window,
in response to receiving a user input to scroll to a second
video of the video feed, the video player client is
configured to display the second video in a second
display region of the GUI in a second display mode in
which at least the second video, the video player tool
bar of the video player client, and a third video are
displayed in the browser window,
in the second display mode, the second display region is
vertically larger than the first display region of the first
display mode, and the third video is displayed below
the second video and under the video player tool bar of
the video player client in a visual stacking order along
a z-axis, such that the video player tool bar overlays the
third video and the third video overlays the browser
navigation bar, to thereby inhibit display of the browser
navigation bar and enable display of the video player
tool bar and a portion of the third video that remains
visible beyond the video player tool bar,
the third video is assigned a z-order corresponding to the
visual stacking order along the z-axis that positions the
third video in the foreground of the GUI relative to the
browser navigation bar and positions the third video in
the background of the GUI relative to the video player
tool bar, and
in the second display mode, the second video is displayed
in an upper portion of the second display region, the
third video is displayed in a lower portion of the second
display region, and only a top portion of the third video
is visible in the GUI.

* * * * *